US012781043B2

(12) United States Patent
Liao et al.

(10) Patent No.: US 12,781,043 B2
(45) Date of Patent: Nov. 3, 2026

(54) POLYESTER FILM

(71) Applicant: NAN YA PLASTICS CORPORATION, Taipei (TW)

(72) Inventors: Te-Chao Liao, Taipei (TW); Wen-Cheng Yang, Taipei (TW); Chun-Che Tsao, Taipei (TW); Chia-Yen Hsiao, Taipei (TW); Yueh-Shin Liu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 550 days.

(21) Appl. No.: 18/360,797

(22) Filed: Jul. 27, 2023

(65) Prior Publication Data

US 2024/0384091 A1 Nov. 21, 2024

(30) Foreign Application Priority Data

May 19, 2023 (TW) ................................ 112118634

(51) Int. Cl.

| | |
|---|---|
| ***C08L 67/02*** | (2006.01) |
| ***B32B 7/12*** | (2006.01) |
| ***B32B 27/08*** | (2006.01) |
| ***B32B 27/36*** | (2006.01) |
| ***C08K 3/36*** | (2006.01) |
| ***C08K 5/098*** | (2006.01) |

(52) U.S. Cl.

CPC ................ *C08L 67/02* (2013.01); *B32B 7/12* (2013.01); *B32B 27/08* (2013.01); *B32B 27/36* (2013.01); *C08K 3/36* (2013.01); *C08K 5/098* (2013.01); *B32B 2250/03* (2013.01); *B32B 2250/244* (2013.01); *B32B 2270/00* (2013.01); *B32B 2272/00* (2013.01); *B32B 2307/414* (2013.01); *B32B 2307/518* (2013.01); *B32B 2307/746* (2013.01); *C08L 2203/16* (2013.01); *C08L 2205/025* (2013.01); *C08L 2207/20* (2013.01)

(58) Field of Classification Search

None

See application file for complete search history.

(56) References Cited

U.S. PATENT DOCUMENTS

2020/0171791 A1* 6/2020 Liao ........................ B32B 27/08
2021/0371624 A1 12/2021 Knerr et al.

FOREIGN PATENT DOCUMENTS

CN 115160550 10/2022
JP 7216353 2/2023
JP 7243906 3/2023

(Continued)

OTHER PUBLICATIONS

TW 202330241 Eng trans (Year: 2023).*

(Continued)

*Primary Examiner* — Jeffrey D Washville
(74) *Attorney, Agent, or Firm* — JCIPRNET

(57) ABSTRACT

A polyester film includes a first layer, a second layer, and a third layer. The first layer includes a first recycled material. The second layer includes a second recycled material. Both the first recycled material and the second recycled material are a PET bottle recycled material. The third layer is disposed between the first layer and the second layer. The third layer includes a third recycled material, and the third recycled material includes a release film recycled material.

9 Claims, 1 Drawing Sheet

(56) References Cited

FOREIGN PATENT DOCUMENTS

| | | | | |
|---|---|---|---|---|
| TW | 202140287 | | 11/2021 | |
| TW | 202330241 A | * | 8/2023 | ............. B32B 27/08 |
| WO | 2022172735 | | 8/2022 | |

OTHER PUBLICATIONS

"Office Action of Japan Counterpart Application", issued on Aug. 19, 2024, p. 1-p. 5.
"Office Action of Taiwan Counterpart Application", issued on Nov. 17, 2023, p. 1-p. 5.

* cited by examiner

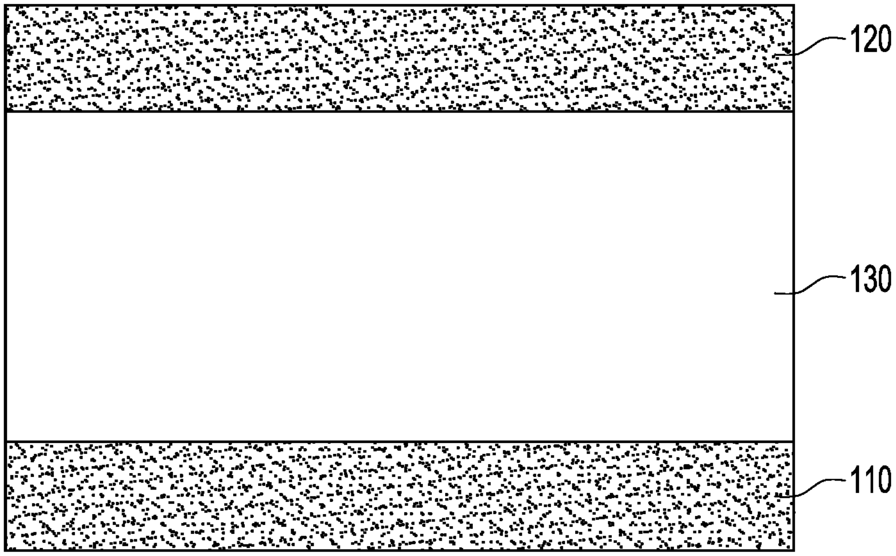
100

POLYESTER FILM

CROSS-REFERENCE TO RELATED APPLICATION

This application claims the priority benefit of Taiwan application serial no. 112118634, filed on May 19, 2023. The entirety of the above-mentioned patent application is hereby incorporated by reference herein and made a part of this specification.

BACKGROUND OF THE INVENTION

Field of the Invention

The invention relates to a polyester film.

Description of Related Art

In response to the rising awareness of environmental protection, plastic products are gradually being remanufactured using recycled materials. For example, a polyester film may be made from a recycled polyester material (such as PET bottle recycled material, fabric recycled material, release film recycled material). However, due to issues such as poor heat resistance and/or transparency of the release film recycled material, when the polyester film includes the release film recycled material, processability and quality thereof are more difficult to be maintained.

SUMMARY OF THE INVENTION

The invention provides a polyester film capable of maintaining the processability and the quality thereof.

A polyester film of the invention includes a first layer, a second layer, and a third layer. The first layer includes a first recycled material. The second layer includes a second recycled material. Both the first recycled material and the second recycled material are a PET bottle recycled material. The third layer is disposed between the first layer and the second layer. The third layer includes a third recycled material, and the third recycled material includes a release film recycled material.

In an embodiment of the invention, the polyester film has silicon.

In an embodiment of the invention, a content of the silicon is less than or equal to 0.7 wt % in a content range of the polyester film.

In an embodiment of the invention, a total weight of the first recycled material, the second recycled material, and the third recycled material accounts for 80 wt % or more of the polyester film.

In an embodiment of the invention, a weight of the release film recycled material accounts for more than 0% and less than or equal to 50 wt % in a weight range of the third layer.

In an embodiment of the invention, the third recycled material further includes a PET bottle recycled material.

In an embodiment of the invention, a haze of the polyester film is less than 10%.

In an embodiment of the invention, the polyester film further includes an electrostatic adhesive, a slip agent, or a combination thereof.

In an embodiment of the invention, the electrostatic adhesive agent is a metal salt including an alkali gold ion, an alkaline earth gold ion, or a combination thereof.

In an embodiment of the invention, the slip agent includes silicon dioxide, calcium carbonate, barium sulfate, polystyrene, silica gel, acrylic, or a combination thereof.

Based on the above, via the structural design in which the third layer including the release film recycled material is disposed between the first layer and the second layer formed by the PET bottle recycled material, the adverse effect of the release film recycled material on the performance and the quality of the overall polyester film may be reduced. In this way, the release film recycled material may be introduced into the polyester film to increase the source of the recycled material while maintaining the processability and the quality thereof.

In order to make the aforementioned features and advantages of the disclosure more comprehensible, embodiments accompanied with figures are described in detail below.

BRIEF DESCRIPTION OF THE DRAWINGS

FIGURE is a schematic diagram of a polyester film according to an embodiment of the invention.

DESCRIPTION OF THE EMBODIMENTS

In the following detailed description, for purposes of illustration and not limitation, exemplary embodiments disclosing specific details are set forth in order to provide a thorough understanding of the various principles of the invention. It will be apparent, however, to one of ordinary skill in the art, having the benefit of this disclosure, that the invention may be practiced in other embodiments that depart from the specific details disclosed herein. Moreover, descriptions of well-known devices, methods, materials, and other specific details may be omitted so as not to obscure the description of the various principles of the invention.

Herein, a range indicated by “one value to another value” is a general representation which avoids enumerating all values in the range in the specification. Therefore, the record of a specific numerical range covers any number within this numerical range and any smaller numerical range bounded by any number within that numerical range as if such any number and such smaller numerical ranges were expressly written in the specification.

Unless otherwise stated, the term “between” used in this specification to define numerical ranges is intended to cover ranges equal to and between the stated endpoints. For example, if the size range is between the first value and the second value, it means that the size range may cover the first value, the second value, and any value between the first value and the second value.

In this specification, non-limiting terms (such as: may, can, for example, or other similar terms) refer to an optional or selective implementation, inclusion, addition, or presence.

Unless otherwise defined, all terms (including technical terms and scientific terms) used herein have the same meaning as those with ordinary knowledge or commonly understood in the technical field to which this invention belongs. It should be understood that, terms (such as those defined in commonly used dictionaries) should be interpreted to have meanings consistent with their meanings in the relevant technical background, and should not be interpreted in an idealized or overly formal sense, unless expressly so defined herein.

FIGURE is a schematic diagram of a polyester film according to an embodiment of the invention. Please refer to FIGURE, in the present embodiment, a polyester film 100 includes a first layer 110, a second layer 120, and a third layer 130, wherein the third layer 130 is disposed between the first layer 110 and the second layer 120. Furthermore, the first layer 110 includes a first recycled material, the second layer 120 includes a second recycled material, and both the first recycled material and the second recycled material are a PET bottle recycled material. Moreover, the third layer 130 includes a third recycled material, and the third recycled material includes a release film recycled material. Accordingly, via the structural design in which the third layer 130 including the release film recycled material is disposed between the first layer 110 and the second layer 120 formed by the PET bottle recycled material, the adverse effect of the release film recycled material on the performance and the quality of the overall polyester film 100 may be reduced. In this way, the release film recycled material may be introduced into the polyester film 100 to increase the source of the recycled material while maintaining the processability and the quality thereof.

Here, the polyester film 100 may be a biaxially stretched polyester film, and the haze of the polyester film 100 may be controlled at less than 10%, and is cooled from a molten state at a cooling rate of 20° C./min. The recrystallization temperature (Tc)) may be controlled at 175° C. to 205° C., and the pre-stretch slab DSC analysis may be controlled at a crystallization rate of less than 15%, wherein the extruder melts and extrudes, and the molding wheel is cooled to form the pre-stretch slab, and the slab may be bidirectionally stretched to form a bidirectionally stretched polyester film.

More specifically, usually, slurry and siloxane release agent are coated on the release film recycled material, resulting in issues such as poor heat resistance and transparency. Therefore, if the release film recycled material is used to make polyester film again, the siloxane is readily cracked and attached to the heat-stretching oven during the heat-stretching stage, and over time, is decomposed into small molecules and adsorbed on the film, resulting in poor processability and quality of the polyester film and readily causing damage to the process equipment, and the poor transparency also significantly increases the haze of the polyester film. Therefore, via the structural design that the third layer 130 including the release film recycled material is disposed between the first layer 110 and the second layer 120 made of the PET bottle recycled material, the third layer 130 including the release film recycled material may be isolated from the external environment, so as to simultaneously reduce the probability of hot release agent and reduce the adverse effect thereof on haze. Therefore, in addition to effectively maintaining the performance and the quality of the polyester film 100, the probability of damage to the process equipment may also be reduced, thereby reducing manufacturing cost, but the invention is not limited thereto.

In some embodiments, since the content of the PET bottle recycled material does not include silicon, and the content of the release film recycled material includes silicon, the polyester film 100 including the release film recycled material may have silicon (greater than 0%) compared to a polyester film for which the recycled source is only the PET bottle recycled material, for example, the silicon content accounts for less than or equal to 0.7 wt % in the content range of the polyester film, but the invention is not limited thereto.

In some embodiments, the first recycled material and the second recycled material may be formed by only the PET bottle recycled material, but the invention is not limited thereto.

In some embodiments, since the present embodiment introduces the release film recycled material to increase the source of the recycled material, the use ratio of the recycled material may be significantly increased to improve the competitiveness of the polyester film 100. For example, the total weight of the first recycled material, the second recycled material, and the third recycled material accounts for 80 wt % or more (for example, 80 wt % to 100 wt %) of the polyester film 100. But the invention is not limited thereto, and the proportion of the recycled material may be determined according to actual design requirements.

In some embodiments, the release film recycled material accounts for more than 0% and less than or equal to 50 wt % in the weight range of the third layer 130, but the invention is not limited thereto.

In some embodiments, the third recycled material may optionally further include the PET bottle recycled material, wherein the PET bottle recycled material accounts for 50 wt % or more in the weight range of the third layer 130, but the invention is not limited thereto.

In some embodiments, the PET bottle recycled material in the first layer 110, the second layer 120, and/or the third layer 130 may include physically recycled polyester (physical PET bottle recycled material) and chemically recycled polyester (chemical PET bottle recycled material) to further increase the use ratio of the PET bottle recycled material in the polyester film 100, but the invention is not limited thereto.

In some embodiments, the release film recycled material in the third layer 130 may be a physically regenerated release film recycled material, but the invention is not limited thereto.

In some embodiments, the polyester film 100 further includes an electrostatic adhesive, a slip agent, or a combination thereof, wherein the electrostatic adhesive includes an alkali metal ion (such as lithium salt, sodium salt, potassium salt, or a combination thereof). The lithium salt includes, for example, lithium acetate dihydrate ($CH_3COOLi{\cdot}2H_2O$), the sodium salt includes, for example, sodium acetate trihydrate ($CH_3COONa{\cdot}3H_2O$), and/or the potassium salt includes, for example, potassium acetate ($CH_3COOK$), an alkaline earth gold ion, or a metal salt of the combination thereof (for example, magnesium salt, and the magnesium salt includes, for example, magnesium acetate tetrahydrate (($(CH_3COO)_2Mg{\cdot}4H_2O$)), and the slip agent includes silicon dioxide, calcium carbonate, barium sulfate, polystyrene, silica gel, acrylic, or a combination thereof. Here, the slip agent may be in granular form.

In some embodiments, the polyester film 100 may be formed by the first recycled material, the second recycled material, and the third recycled material respectively formed by a polyester mixture. That is, the first recycled material is the polyester mixture, the second recycled material is the polyester mixture, and the third recycled material is the polyester mixture, wherein the polyester mixture includes a polyester resin, an electrostatic adhesive, and a slip agent. In particular, in each recycled material (such as the first recycled material, the second recycled material, the third recycled material), based on the polyester mixture, the weight concentration of the metal ion of the electrostatic adhesive is between 40 ppm and 50 ppm, and based on the polyester mixture, the weight concentration of the slip agent is between 500 ppm and 3000 ppm, but the invention is not limited thereto.

In some embodiments, an electrostatic adhesive, a slip agent, or a combination thereof may be added to the first layer 110, the second layer 120, and/or the third layer 130, but the invention is not limited thereto.

In some embodiments, the polyester film 100 may be a polyethylene terephthalate (PET) film. Therefore, the PET bottle recycled material and the release film recycled material are also a polyethylene terephthalate material, and the source of the recycled material may be an industrial waste PET film material, but the invention is not limited thereto.

In some embodiments, the first layer 110, the second layer 120, and/or the third layer 130 may further include redundant parts of the polyester film, such as an ear material cut off during processing, but the invention is not limited thereto. In some embodiments, the third layer 130 may further include redundant parts of the polyester film or the release film, such as: an ear material cut off during processing, but the invention is not limited thereto.

In some embodiments, the first layer 110, the second layer 120, and/or the third layer 130 may further include a non-recycled polyester material, such as a virgin polyester pellet, but the invention is not limited thereto.

In some embodiments, the application fields of the polyester film 100 include magnetic tapes, insulating tapes, photo films, drawing films, packaging films, electrical insulating films, engineering papers, but the invention is not limited thereto. It should be noted that, depending on the application field, other suitable additives may be further sprayed on the surface of the polyester film, which is not limited in the invention.

In some embodiments, the thickness of the polyester film 100 ranges from 5 μm (micrometer) to 350 μm, but the invention is not limited thereto.

In some embodiments, the thickness of the first layer 110 ranges from 1.5% to 15% of the thickness of the polyester film 100, the thickness of the second layer 120 ranges from 1.5% to 15% of the thickness of the polyester film 100, and the thickness of the third layer 130 ranges from 70% to 97% of the thickness of the polyester film 100, but the invention is not limited thereto.

The following examples and comparative examples are given to illustrate the effects of the invention, but the patent scope of the invention is not limited to the scope of the examples.

The polyester film produced in each example and comparative example was evaluated by the following method.

Color: the b* value of the CIE 1976 color space was analyzed using the Type ND300A color difference meter (Hunter Method) of Tokyo Denshoku CO., LTD.

Haze: the haze of the polyester film was tested using the Haze Meter (Nippon Denshoku Company; model NDH-7000), and the method complied with the JIS K7705 specification.

Recrystallization temperature (Tc): according to the ISO 11357-3:2013 (Determination of temperature and enthalpy of melting and crystallization) standard, the analysis was carried out by differential scanning calorimetry (DSC).

Crystallization rate: according to the ISO 11357-3:2013 (Determination of temperature and enthalpy of melting and crystallization) standard, the analysis was carried out by differential scanning calorimetry (DSC).

COMPARATIVE EXAMPLE 1, EXAMPLES 1 TO 3

The polyester film was prepared using the first layer, the second layer, and the third layer shown in Table 1, wherein the corresponding manufacturing methods are as follows.

Physical PET bottle recycled material manufacturing method: the recycled polyester PET bottle material was melted into a molten state. Then, the recycled PET bottle polyester material was filtered in the molten state via a filter screen to remove solid impurities therein. Next, the filtered recycled PET bottle polyester material may be extruded and granulated by an extruder (for example: commercially-available single-screw extruder (SSE), twin-screw extruder (TSE), or other similar screw extruders) to form a physical PET bottle recycled material. During the manufacturing process, an additive (such as an electrostatic adhesive, a slip agent) may be added and mixed by attaching a corresponding feeder to the extruder. The electrostatic adhesive included 1000 ppm magnesium acetate tetrahydrate, 200 ppm lithium acetate dihydrate, 200 ppm sodium acetate trihydrate, and 200 ppm potassium acetate. The slip agent was 5000 ppm silicon dioxide microparticles with an average particle size of about 2.4 micrometers (μm).

Chemical PET bottle recycled material manufacturing method: chemical depolymerization was performed on the recycled PET bottle polyester material in a depolymerization tank to form polyester components with shorter molecular chains or ester monomers (e.g.: bis(2-hydroxyethyl) terephthalate (BHET)). Next, the product after the depolymerization reaction was filtered and subjected to an esterification reaction in the esterification tank. During the esterification process, an additive (such as: an electrostatic adhesive, a slip agent, a polymerization catalyst) may be added to the esterification tank. Next, the product after the esterification reaction was subjected to a polymerization reaction in the polymerization tank and polymerized until the material in the tank had the corresponding intrinsic viscosity (IV). Via a common granulation method of general polymer pellets, the material in the tank was extruded and pelletized to form polyester pellets to form the PET bottle recycled material. The electrostatic adhesive included 500 ppm magnesium acetate tetrahydrate, 100 ppm lithium acetate dihydrate, 100 ppm sodium acetate trihydrate, and 100 ppm potassium acetate. The slip agent was 5000 ppm silicon dioxide microparticles with an average particle size of about 2.4 micrometers (μm). The polymerization catalyst was 350 ppm of antimony acetate.

Physical release film recycled material manufacturing method: the recycled release film for which the surface was removed of slurry and cleaned was crushed and melted into a molten state. Then, the recycled release film polyester material was filtered in the molten state via a filter screen to remove solid impurities therein. Next, the filtered recycled release film polyester material was extruded and granulated by an extruder (such as a single-screw extruder, twin-screw extruder, or other similar screw extruders) to form a physical release film recycled material.

Polyester film manufacturing method: the polyester pellet material (physical PET bottle recycled material, chemical PET bottle recycled material, physical release film recycled material, virgin polyester pellet) was mixed and dried in a suitable proportion according to the design. The polyester pellet material needed for the three-layer structure of the polyester film was sequentially put into the corresponding three extruders, and heated and melted for co-extrusion. In the co-extrusion process, the three-layer molten polyester material designed according to the stack was extruded from the extrusion die (T-Die) and dropped on a molding cooling wheel, and the sheet after cooling and molding is called the pre-stretched slab. Then, the pre-stretched slab was biaxially stretched to form a biaxially stretched polyester film, which was to first guide the pre-stretched slab into a longitudinal stretching machine for longitudinal stretching to form a longitudinally stretched slab, and then the longitudinally stretched slab was introduced into a transverse stretching machine for transverse stretching to form a bidirectionally stretched polyester film.

The relevant characteristics of the polyester film manufactured were tested, and the results thereof are shown in Table 1. After comparing the results of Examples 1 to 3 and Comparative example 1 of Table 1, the following conclusions may be obtained: compared with Comparative example 1, Examples 1 to 3 may introduce the release film recycled material into the polyester film to increase the source of the recycled material while maintaining performance and quality at a certain level.

TABLE 1

| | | Example | | | Comparative example |
|---|---|---|---|---|---|
| | | 1 | 2 | 3 | 1 |
| First layer (film thickness 7.5 μm) | Physical PET bottle recycled material | 30 wt % | 30 wt % | 30 wt % | 30 wt % |
| | Chemical PET bottle recycled material | 70 wt % | 70 wt % | 70 wt % | 70 wt % |
| Second layer (film thickness 7.5 μm) | Physical PET bottle recycled material | 30 wt % | 30 wt % | 30 wt % | 30 wt % |
| | Chemical PET bottle recycled material | 70 wt % | 70 wt % | 70 wt % | 70 wt % |
| Third layer (film thickness 60 μm) | Physical PET bottle recycled material | 30 wt % | 30 wt % | 30 wt % | 30 wt % |
| | Chemical PET bottle recycled material | 60 wt % | 40 wt % | 20 wt % | 70 wt % |
| | Physical release film recycled material | 10 wt % | 30 wt % | 50 wt % | 0 wt % |
| Color b* | | 6 | 8 | 11 | 5 |
| Haze (%) | | 3.3 | 4.4 | 8.1 | 2.8 |
| Recrystallization temperature Tc (20) (° C.) | | 188 | 197 | 201 | 179 |
| Crystallization rate (%) | | 7.2 | 11.2 | 13.1 | 8.9 |

Based on the above, in the invention, via the structural design in which the third layer including the release film recycled material is disposed between the first layer and the second layer formed by the PET bottle recycled material, the adverse effect of the release film recycled material on the performance and the quality of the overall polyester film may be reduced. In this way, the release film recycled material may be introduced into the polyester film to increase the source of the recycled material while maintaining the processability and the quality thereof.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A polyester film:

a first layer comprising a first recycled material;

a second layer comprising a second recycled material, wherein both the first recycled material and the second recycled material are a PET bottle recycled material; and a third layer disposed between the first layer and the second layer, wherein the third layer comprises a third recycled material, the third recycled material comprises a released film recycled material, and a weight of the release film recycled material accounts for more than 10% and less than or equal to 50 wt % in a weight range of the third layer.

2. The polyester film of claim 1, wherein the polyester film has silicon.

3. The polyester film of claim 2, wherein a content of the silicon is less than or equal to 0.7 wt % in a content range of the polyester film.

4. The polyester film of claim 1, wherein a total weight of the first recycled material, the second recycled material, and the third recycled material accounts for 80 wt % or more of the polyester film.

5. The polyester film of claim 1, wherein the third recycled material further comprises a PET bottle recycled material.

6. The polyester film of claim 1, wherein a haze of the polyester film is less than 10%.

7. The polyester film of claim 1, further comprising an electrostatic adhesive, a slip agent, or a combination thereof.

8. The polyester film of claim 7, wherein the electrostatic adhesive comprises an alkali metal ion, a metal salt of an alkaline earth gold ion, or a combination thereof.

9. The polyester film of claim 7, wherein the slip agent comprises silicon dioxide, calcium carbonate, barium sulfate, polystyrene, silica gel, acrylic, or a combination thereof.

* * * * *